May 12, 1970    S. O. I. JONSSON ET AL    3,511,348
REVERSIBLE FREEWHEEL CLUTCH MECHANISM HAVING
AUTOMATICALLY ACTING PAWL RELEASE MEANS
Filed June 6, 1968    2 Sheets-Sheet 1

INVENTOR
SVEN O. I. JONSSON
RUNE B. JONSSON.
*Mullin & Siegel*
ATTORNEYS

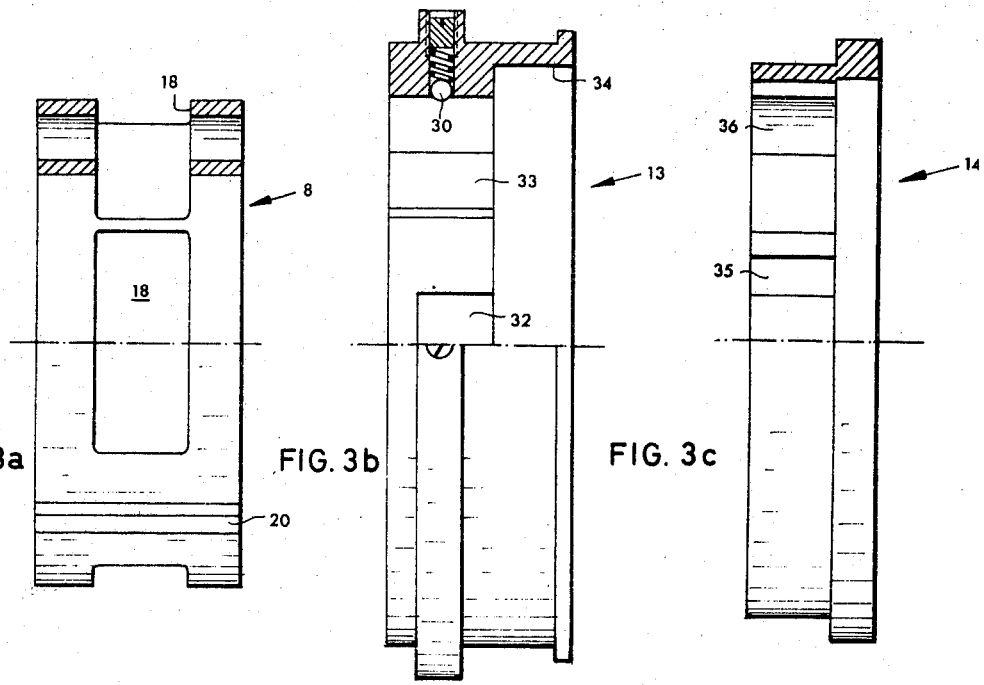
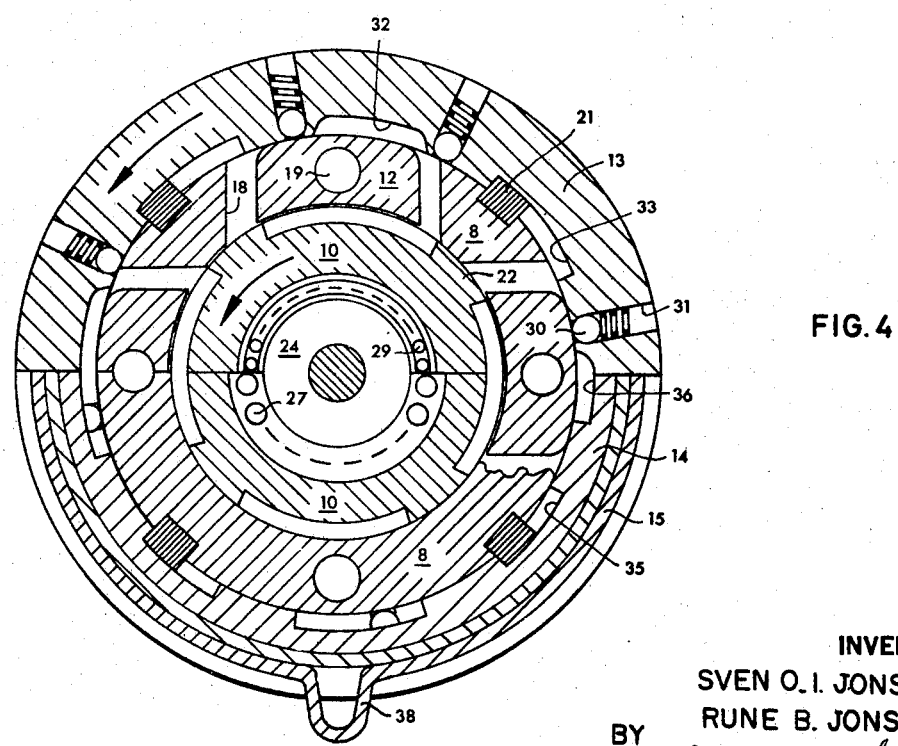

United States Patent Office 3,511,348
Patented May 12, 1970

3,511,348
REVERSIBLE FREEWHEEL CLUTCH MECHANISM HAVING AUTOMATICALLY ACTING PAWL RELEASE MEANS
Sven O. I. Jonsson, Storebro, and Rune B. Jonsson, Vimmerby, Sweden, assignors to Aktiebolaget Hagelsrums Mekaniska Verkstad, Malilla, Sweden, a corporation of Sweden
Filed June 6, 1968, Ser. No. 735,159
Claims priority, application Sweden, Dec. 27, 1967, 17,840/67
Int. Cl. F16d 13/04, 43/00
U.S. Cl. 192—43.1   7 Claims

ABSTRACT OF THE DISCLOSURE

An automatically reversing freewheel clutch mechanism having an input driving hub and an output driving hub, a pawl cylinder on one hub and a ratchet cylinder on the other, pawls for establishing a power wheel between the hubs, a reversing ring between the hubs and rotatable a limited amount in relation to the driving hub, the reversing ring forcing the pawls in one direction or the other depending on the rotational direction of the clutch mechanism, clutch mechanism intended to be interconnected between a driving shaft and an idle shaft which is normally rotating at a higher speed than the driving shaft. The clutch mechanism comprises an input driving hub, an output driven hub and pivotally mounted pawls between said input and output hubs for establishing a power transmitting axle between said two hubs. The pawls will at a reversion of rotational direction automatically cause a reversion of the function of the clutch mechanism.

Figure 1:
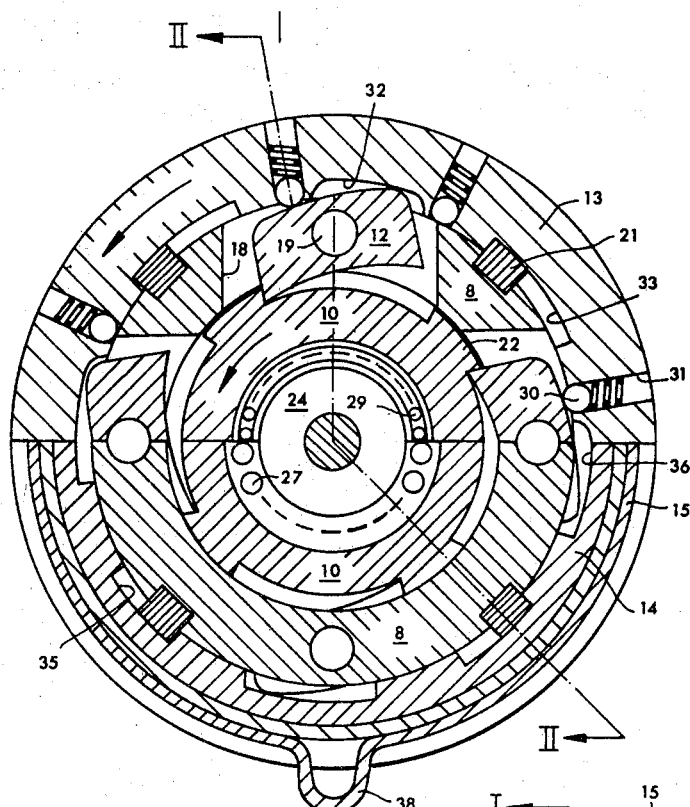

The freewheel clutch mechanism according to the invention is specifically intended to be inter-connected between an output power source of a driving vehicle as for instance a tractor or the like and an input driving shaft of a trailer connected to said vehicle.

Previously known freewheel clutch mechanism have usually been constructed for being interconnected between the driving motor and a pair of driving wheels and the clutch mechanisms have thereby acted in such a manner that the driving motor has forced the wheels to rotate unless the carriage is running at a higher speed than the corresponding number of revolutions of the driving motor. At slopes downwards or on other occasions when the carriage has attained a greater velocity than what corresponds to the number of revolutions of the motor the freewheel clutch mechanism has however come into action so that the carriage has been able to run idle i.e. independently of the driving motor.

Previously known freewheel clutch mechanisms of the kind mentioned have not been suited for being connected between the power take off of a driving vehicle and a trailer having driving wheels depending on the difficulties to get the driving wheels of the trailer to rotate at the same peripheral speed as the driving wheels of the tractor vehicle. Even if one succeeds in getting such a transmission ratio between the driving wheels of the trailer and the power takeoff of the tractor vehicle that the two pairs of driving wheels rotate at the same peripheral speed on plain ground and when the carriage is being driven rectilinear said driving wheels of the trailer will at turning the carriage get a less turning radius than that of the tractor vehicle. As a consequence the driving wheels either of the trailer or the tractor vehicle will skid forwardly or rearwardly resp., which causes wear and tear of tires as well as couplings and other mechanical parts.

There is consequently a need of a clutch mechanism of a kind which may be successfully interconnected between the power takeoff of a tractor vehicle and the input power axis of a trailer having driving wheels, the transmission ratio of which is so calculated that the driving shaft thereof at plain ground and at rectilinear driving of the carriage rotates at a higher speed than that of the power takeoff of the tractor vehicle. In such an arrangement the driving wheels of the trailer will not act as driving wheels until the driving wheels of the tractor vehicle skid and the power takeoff as a consequence thereof rotates at a higher speed than what corresponds to the driving velocity of the carriage. As soon as the driving wheels of the tractor vehicle stop, skidding the pushing action of the trailer ceases and no unnecessary wear and tear of tires, couplings or other parts will therefore arise. The transmission ratio between the power output of the tractor vehicle and the input power axis of the trailer should thereby preferably be so chosen that the driving wheels of the trailer will not start their driving action during turning movements but only at a skidding of the driving wheels of the tractor vehicle which may occur at the same time.

It has been proposed to form a clutch mechanism of the kind mentioned with an input and an output hub adapted to be interconnected by means of one or more pawls pivotally mounted in one of said hubs whereby the pawls at forcing the freewheel clutch to rotate in one direction are being biassed in one direction while at forcing the freewheel clutch to rotate in the other direction said pawls will automatically be pivoted so as to be resiliently biassed in the other direction, and in which clutch mechanism a reversing ring rotatable a limited distance in relation to the output hub provides both the resiliently forcing of the pawls and a complete assurance that the pawls not during operation of the carriage be pivoted into their reversed positions, which might result in disastrous consequences.

When driving with a clutch mechanism of said proposed kind the pawls which are adapted to provide the driving action of the trailer will continuously snap over the ratchet teeth of the ratchet wheel as long as the driving wheels of the trailer does not skid. It has however proved that the snapping movements of the pawls bring out a wear and tear of same at the same time as a snap sound is occurring for every snap over.

The present invention is intended to overcome the disadvantages mentioned and to provide a freewheel clutch mechanism of the kind in question in which the pawls under normal conditions are being kept in a position where there are no snapping movements over a ratchet wheel and no jarring sound due to the snapping movements. What is especially characterizing for the invention will be evident from the appended claims and will be further explained below with references made to the accompanying drawings.

Figure 2:
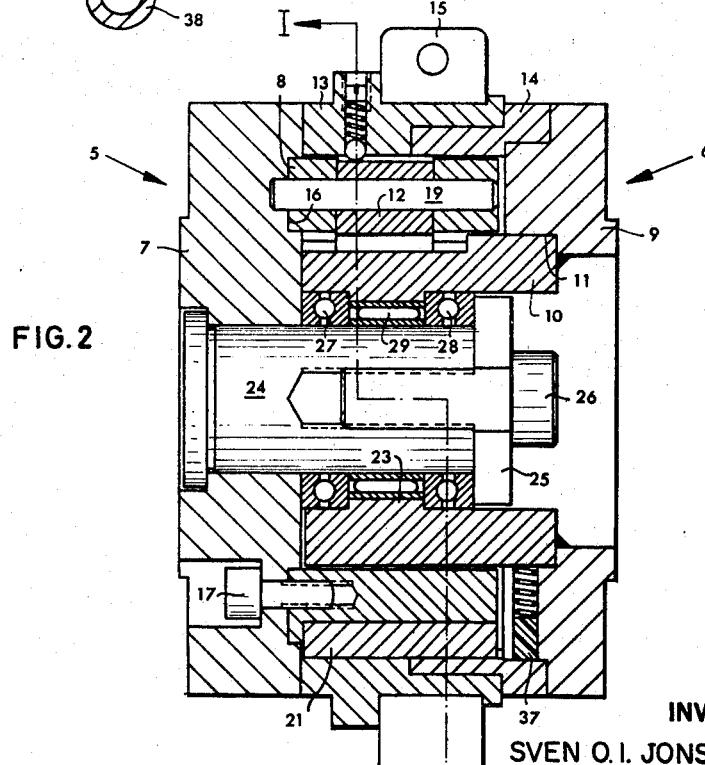

In the drawings FIG. 1 shows a diametrical cross section through a freewheel clutch mechanism according to the invention seen as from the line I—I of FIG. 2. FIG. 2 shows an axial cross section through the clutch mechanism according to FIG. 1 seen as from line II—II of FIG. 1. The FIGS. 3a, 3b and 3c show in a separated projection the active reversing part partly in cross section of the clutch according to FIGS. 1 and 2. FIG. 4 shows the clutch according to the invention in the same manner as in FIG. 1 in a position where the pawls are being raised so as to prevent the snapping action.

The freewheel clutch mechanism according to the invention includes an input clutch hub 5, an output clutch hub 6 and a ratchet mechanism provided between said two clutch hubs. The input clutch hub 5 is intended to be connected to a power take off of a driving or tracting vehicle as for instance a tractor, while the output hub 6 is intended to be connected to the input driving shaft of a trailer likewise provided with driving wheels, the driving shaft of which rotates at the same speed as or preferably at higher speed than that of the output power shaft of the tractor vehicle.

The input hub 5 comprises a clutch end portion 7 and a pawl cylinder 8. The pawl cylinder 8 is by suitable means for instance screw joint, rivet joint, welded joint or the like mounted coaxially with the end portion 7.

The output hub 6 is in turn composed of a clutch end portion 9 and a ratchet cylinder 10 coaxially connected to the end portion 9. The ratchet cylinder 10 is preferably mounted in a groove 11 in the inside of the clutch end portion 9 and is in this position welded together with said end portion 9.

The ratchet mechanism provided between the two clutch hubs 5 and 6 includes a number of pawls 12 pivotally mounted in the pawl cylinder 8 so as to when necessary engage ratchet teeth of the ratchet cylinder 10, a reversing ring 13 acting upon the pawls 12 so as to engage said ratchet cylinder 10 and at a change of rotational direction automatically providing a change of the engaging positions of the pawls 12, a pawl raising ring 14 under normal conditions raising the pawls 12 so as to prevent them from continuously snapping over the teeth of the ratchet cylinder 10 and finally a friction ring 15 providing an assurance against unallowable displacement of the pawl cylinder 8 in relation to the reversing ring 13. The embodiment of the freewheel clutch mechanism showed in the drawings is formed with four symmetrically arranged engagement units which are completely identical and act at the same time and in the same manner. The clutch mechanism can however when necessary be formed with any suitable number of engagement units.

In the embodiment of the invention shown in the drawings the pawl cylinder 8 is mounted in a groove 16 of the input clutch end portion 7 and is fixed thereto by means of four screws 17. The pawl cylinder 8 is formed as a symmetrical hollow cylinder body having four radial parallelepipedical cuttings 18 running straight through the material of the cylinder 8. Said cuttings 18 have an axial width less than that of the pawl cylinder 8, and they are provided substantially central as well axially as radially. The cuttings 18 are adapted to receive the pawls 12 and they are for this purpose of such a width that the pawls 12 may execute their pivotal movements within said cuttings 18. The pawls 12 are kept centrally within the cuttings by means of taps 19 running straight through the material of the pawl cylinder 8 and suitably secured into the material of the input clutch end portion 7. The pawl cylinder 8 is also provided with four axial key grooves 20 at the non-cut material of the cylinder. The key grooves 20 are adapted to receive keys 21 co-acting with corresponding key grooves of the reversing ring 13 as well as the pawl raising ring 14 and to make it possible to turn said rings 13 and 14 a limited distance in relation to the pawl cylinder 8. The keys 21 can if it is found to be suitable be clinched or in any other way be fixed in the key grooves 20 of the pawl cylinder 8.

The ratchet cylinder 10 is formed as a conventional ratchet having four symmetrically arranged outer teeth 22 to their form and magnitude corresponding to the pawls 12. The ratchet cylinder 10 is provided with a radially inwards turning flange 23 the purpose of which is to form a carrier surface and supporting edges respectively for needle or ball bearings at the assembling of the two hub parts. Said assembling will take place by means of a central bolt 24 the head of which contacts a flange of the input clutch end portion 7 and which is clamping two axial bearings 27 and 28 and a radial bearing 29 together by means of a washer 26 which is kept fixed to the bolt 24 by means of a screw 27. The two axial bearings 27 and 28 are resting against the end edges of the radial flange 23 of the ratchet cylinder 10 and the radial bearing 29 is resting against the periphery of said flange 23.

The reversing ring 13 is within the range of each pawl 12 provided with two actuating devices for said pawl. Each of said actuating devices includes a ball 30 which is displacable in a radial bore 31 in the reversing ring 13 where the ball 30 is being biassed inwards by a spring locked by a screw. The bore 31 is reduced in diameter at its inner end so that the ball 30 may extend somewhat inside the inner periphery of the reversing ring 13 without falling out of the bore 31. The two balls actuating one and the same pawl are located in such a mutual distance that one of the balls can solely force the pawl to turn in one direction while the other ball will solely force the pawl to turn in the opposite direction. Between the two balls the reversing ring 13 is formed with an axial cutting 32 of such a depth that it can receive the turned out part of the pawl at a completely turned pawl. Between the groups of two actuating balls and an intermediate cutting the reversing ring 13 is formed with a key groove 33 having a depth corresponding to the height of the key 21 and having a peripheral length making it possible to turn the reversing ring 13 and consequently also the pawls 12 an angle in relation to the pawl cylinder 8 exactly corresponding to the necessary relative displacement for providing a change of position of the pawls 12. The reversing ring 13 is in its one end formed with a circular, turned out groove 34 exactly fitting to the outer dimensions of a part of the pawl raising ring 14. The axial depth of the groove 34 is of such a magnitude that the pawl raising ring 14 will somewhat overlap the pawls 12. The pawl raising ring is like the reversing ring 13 formed with a key groove 35 having a depth substantially corresponding to the height of the key 21 and having a peripheral length which will make it possible to turn the pawl raising ring 14 such an angle in relation to the pawl cylinder 12 and the pawls mounted therein that the pawl raising ring 14 will prevent the pawls 12 from being forced down into the slots between the teeth 22 of the ratchet cylinder 10. In order to make such a turning down of the pawls 12 possible the pawl raising ring 14 is however formed with a second series of axial grooves 36 to their length and depth substantially corresponding to the dimensions of the cuttings 32 of the reversing ring 13.

For the purpose of preventing the pawl raising ring 14 from being displaced in relation to the pawl cylinder 8 and the pawls 12, thereby making it possible for the pawls 12 to turn down into the grooves between the teeth 22 of the ratchet cylinder 10 the output clutch end portion 9 is provided with friction taps 37 which are being biassed against the inner periphery of the pawl raising ring 14, thereby forcing same in a direction determined from the rotational direction of the clutch.

Fitted into a groove of the reversing ring 13 the friction brake ring 15 runs round said ring 13. The friction ring 15 is for instance in its lower portion formed with a loop 38 while in its upper portion it is open but provided with means for variably biassing same against the reversing ring 13 so as to establish a regulatable friction force between the friction brake ring 15 and the reversing ring 13.

When the carriage moves as the tractor vehicle begins to move the output power axle thereof forces the input clutch hub 5 to rotate. In the drawings there has been presupposed a rotation counter clockwise, i.e. in the direction of the arrows of the FIGS. 1 and 4. Due to the friction force acting between the fixed friction brake ring 15 and the reversing ring 13 the latter is prevented from following the rotating movement of the input clutch hub 5 until the clutch has taken the position shown in FIG. 1, where the keys 21 of the pawl cylinder 8 engage the forward edges of the key grooves 33 of the pawl cylinder 8. The position thus taken will be kept until the rotational direction is reversed and the reversing ring 13 will then take its opposite extreme position in relation to the pawl cylinder 8. In the position now taken the forward one of the two balls 30 of each group of biassing balls will now force the pawls 12 to turn in a counter clockwise direction and the position shown in FIG. 1 will then be adopted. The pawls 12 will thereby with the inner and forward edges thereof be located in the grooves between the teeth 22 of the ratchet cylinder 10, while the outer and rearward edges thereof will be located in the cuttings 32 of the reversing ring 13.

Substantially at the same moment as the input clutch hub begins to rotate and the carriage gets into motion also the output clutch hub 6 will be forced to rotate because the wheel axle of the trailer begins to move. Since however said wheel axle is calculated for a higher rotational speed than the output power axis of the tractor vehicle the output clutch hub 6 will progressively rotate in a clockwise direction in relation to the pawl cylinder 8. Due to the friction force acting between the friction taps 37 of the output clutch end portion 9 and the pawl raising ring 14 also the pawl raising ring 14 will strive to rotate in relation to the pawl cylinder 8. When the pawl raising ring 14 has turned somewhat as regards the ratchet cylinder the rearward edges of its axial groove 36 will turn against the part of the pawls 12 extending into said groove and the cutting 32.

After a short while the first one of the teeth 22 of the ratchet cylinder passing the pawls 12 will however turn said pawls 12 in a counter clockwise direction against the action of the biassing balls 30 whereby at the same time the axial groove 36 of the pawl raising ring is being uncovered to the effect that the pawl raising ring may turn somewhat further until its rearward edges turn against the keys 21. In this position which is shown in FIG. 4 the pawl raising ring 14 overlaps the pawls 12 somewhat to the effect that the pawls are being prevented from turning back in the counter clockwise direction so that its inner and forward edges fall into the grooves between the teeth 22 of the ratchet cylinder. No further snapping movement may take place until the pawl raising ring 14 has made it possible for the pawls to once more take their positions engaging the ratchet cylinder.

If however the driving wheels of the tractor vehicle should begin to skid the input clutch hub 5 will from a given moment rotate at a higher speed than that of the output clutch hub 6, what has as a result that the pawl raising ring 14 will be forced to rotate clockwise in relation to the pawl cylinder 8 and said clockwise rotating movement will not cease until the pawl raising ring 14 turns against the keys 21 with its forward edges. As will be seen from FIG. 1 the axial groove 36 will thereby be so positioned that the pawls 12 may be returned in a counter clockwise direction, and as a result thereof the pawls 12 now rotating at a higher speed than the ratchet cylinder 10 will engage the teeth 22 thereof and force same to rotate in a counter clockwise direction. The driving wheels of the trailer which are coupled to the ratchet cylinder 10 will thereby become driving at the same time as the driving wheels of the tractor vehicle and said driving action of the trailer wheels will not cease until the output clutch hub 6 once more begins to rotate at a higher speed than that of the input clutch hub 5, and this does not happen until the tractor wheels stop skidding. As soon as this last mentioned position has been occupied the pawl raising ring 14 will once more raise the pawls 12 so as to prevent a snapping movement thereof and a following noise and wear and tear.

At a reversion of the rotational direction the same functions as those mentioned above will automatically be executed but for the difference that the active biassing balls 30 showed in the drawings will be put into resting position while the biassing balls positioned at the clockwise side thereof will take their active positions thereby striving to turn the pawls in the clockwise direction.

It is obvious to the man skilled in the art that the freewheel clutch mechanism according to the invention may be modified in all kinds of ways and be adapted to the existing circumstances and to the most varied needs of power. It will also be obvious to the man skilled in the art that the clutch may be used whenever the rotational speed of the trailer wheel axle exceeds that of the output power axle of the tractor vehicle. In the special performance of the invention where the free-wheel clutch is being used as a coupling between a tractor vehicle and a trailer of same it has proved to be suitable to exchange the trailer in such a way that the wheel axle thereof rotates at about 10% higher speed than that of the tractor power axle. It is further obvious to the man skilled in the art that the clutch mechanism is capable of being used not only in connection with vehicles but also at any time when an addition of power may be necessary for preventing or eliminating skidding or the like or whenever a temporary addition of power is wanted due to a temporary overload so that a damage of the overloaded part might be avoided.

We claim:

1. An automatically reversing freewheel clutch mechanism adapted to be interconnected between a driving and an idle running wheel axle, said idle running wheel axle, being provided with means for establishing a driving effect, said idle running axle normally rotating at a higher speed than that of the driving axle, the clutch mechanism comprising an input driving hub (5), an output driven driven hub (6), a pawl cylinder (8) on one of said hubs (5, 6), a ratchet cylinder (10) fixedly mounted to the other of said hubs (5, 6), pawls (12) pivotally mounted in said pawl cylinder for establishing a power axle between said two hubs (5, 6) by engaging said ratchet cylinder (10), said pawls (12) at a reversion of the rotational direction of the clutch mechanism automatically reversing the function of the clutch mechanism, a reversing ring (13) mounted between the driving hub (5) and the idle running hub (6) and being rotatable a limited amount in relation to the driving hub (5), a friction ring (15) encircling said reversing ring (13) for preventing rotation of the reversing ring (13) in relation to the pawl cylinder (8), said reversing ring (13) driving to force the pawls (12) in one direction or the other depending on the rotational direction of the clutch mechanism, thereby establishing a power translation between said two hubs (5, 6), a pawl raising ring mounted between said two hubs (5, 6) and being rotatable a limited amount in relation to the driving hub (5), a friction tap (37) applying a friction force to said pawl raising ring (14) to prevent the pawls (12) from establishing a power transmission between said two hubs (5, 6) as long as said idle running hub (6) rotates at the same speed or at a higher speed than that of the driving hub (5).

2. A clutch mechanism according to claim 1 and comprising four identical and symmetrically arranged pawl clutch means and pawl raising means.

3. A clutch mechanism according to claim 1 comprising four identical and symmetrically arranged clutch units, each including two based spring actuated balls (30), each of said balls (30) depending on the rotational direction of the clutch actuating a pawl (12), one ball in one pivotal direction of said pawl (12), the other ball in the opposite direction.

4. A clutch mechanism according to claim 1, wherein the pawl cylinder (8) is provided with radially extending axial keys (21) acting as a limiting means for the displacement of the reversing ring (13) in relation to the pawl cylinder (8).

5. A clutch mechanism according to claim 4, wherein reversing ring (13) in relation to the pawl cylinder (8) coacting with the keys (21) but having a length substantially greater than the peripheral width of said keys (21) and corresponding to the necessary displacement of the reversing ring (13) in relation to the pawl cylinder (8) for the clutch mechanism to be completely reversed.

6. A clutch mechanism according to claim 4, wherein said pawl raising ring (14) is provided with key grooves (35) co-acting with the keys (21) of the pawl cylinder (8) but having a length so much greater than the peripheral width of said keys (21) that the pawl cylinder may be displaced the necessary angle in relation to the pawl raising ring (14) for locking the pawls (12) in their lifted positions.

7. A clutch mechanism according to claim 6, wherein said pawl raising ring (14) is provided with axial grooves (36), said grooves at a rotation of the input hub (5) at the same speed as or at the greater speed than that of the output hub (6) permit the occupying of some part of the pawls (12) thereby making it possible for said pawls (12) to take their positions for actuation of the ratchet cylinder (10).

References Cited

UNITED STATES PATENTS

| | | | |
|---|---|---|---|
| 1,406,211 | 2/1922 | Myers. | |
| 1,680,515 | 8/1928 | Gormley | 192—43.1 |
| 2,531,819 | 11/1950 | Lewis | 192—50 |
| 2,784,820 | 3/1957 | Clark | 192—43.1 X |
| 3,249,185 | 5/1966 | Moorhead | 192—43.1 |
| 3,314,510 | 4/1967 | Zlotek | 192—35 X |

BENJAMIN W. WYCHE III, Primary Examiner

U.S. Cl. X.R.

192—43.1

UNITED STATES PATENT OFFICE
CERTIFICATE OF CORRECTION

Patent No. 3511348   Dated May 12, 1970

Inventor(s) Sven O. I. Jonsson and Rune B. Jonsson

It is certified that error appears in the above-identified patent and that said Letters Patent are hereby corrected as shown below:

Column 1, line 41, "mechanism" should read --mechanisms--.
Column 6, line 67, before "reversing" insert --said--; cancel "in relation to the pawl cylinder (8)" and insert --is provided with key grooves (33)--. Column 7, line 2, after "cylinder" insert --(8)--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents

FORM PO-1050 (10-69)